United States Patent [19]

Ichikawa

[11] Patent Number: 5,047,676
[45] Date of Patent: Sep. 10, 1991

[54] BRUSHLESS LINEAR ACTUATOR WITH SENSOR-ACTIVATED COILS

[75] Inventor: Yoshiaki Ichikawa, Chula Vista, Calif.

[73] Assignee: Hitachi Metals, Ltd., Tokyo, Japan

[21] Appl. No.: 503,299

[22] Filed: Apr. 2, 1990

[51] Int. Cl.⁵ .................. H02K 41/025; B60L 13/02; G05B 11/58
[52] U.S. Cl. ...................................... 310/12; 318/135
[58] Field of Search .............. 310/12, 13, 90; 318/135, 687

[56] References Cited

U.S. PATENT DOCUMENTS

| | | | |
|---|---|---|---|
| 4,369,383 | 1/1983 | Langley | 310/12 |
| 4,392,642 | 7/1983 | Chitayat | 269/73 |
| 4,463,290 | 7/1984 | Asakawa et al. | 318/135 |
| 4,505,464 | 3/1985 | Chitayat | 269/73 |
| 4,560,911 | 12/1985 | Chitayat | 318/135 |
| 4,571,799 | 2/1986 | Chitayat | 29/149.5 A |
| 4,595,870 | 6/1986 | Chitayat | 318/687 |
| 4,625,132 | 11/1986 | Chitayat | 310/13 |
| 4,628,499 | 12/1986 | Hammett | 364/167 |
| 4,733,143 | 3/1988 | Chitayat | 310/12 |
| 4,766,358 | 8/1988 | Higuchi | 318/135 |
| 4,789,815 | 12/1988 | Kobayashi et al. | 310/12 |
| 4,798,985 | 1/1989 | Chitayat | 310/90 |
| 4,803,388 | 2/1989 | Nikura | 310/12 |
| 4,827,164 | 5/1989 | Horber | 310/49 R |
| 4,837,467 | 6/1989 | Newman | 310/12 |
| 4,897,582 | 1/1990 | Otten et al. | 310/12 |
| 4,931,677 | 6/1990 | Heidelberg et al. | 310/12 |

Primary Examiner—William H. Beha, Jr.
Assistant Examiner—D. L. Rebsch
Attorney, Agent, or Firm—Poms, Smith, Lande & Rose

[57] ABSTRACT

A brushless dc linear actuator includes a guide rail which extends in a longitudinal direction, and at least one moving member such as a slide, each of which is movable along the guide rail in the longitudinal direction. Each moving member includes permanent magnets. Rail supports are provided for each end of the guide rail and for holding the guide rail substantially horizontal. The moving member is propelled electromagnetically forward and backward along the rail by sequential activation of at least one series of electromagnetic coils distributed longitudinally with a predetermined pitch. A Hall-effect arrangement, including one Hall-effect element adjacent to each coil, provides non-impulsive, gradual activation and shut-off of active ones of the coils within a predetermined distance of the permanent magnets of the moving member. The pitch of the coils is determined as a precise function of the width of the permanent magnets, a phase simulation constant, and a coil selection constant.

18 Claims, 7 Drawing Sheets

FIG. 3
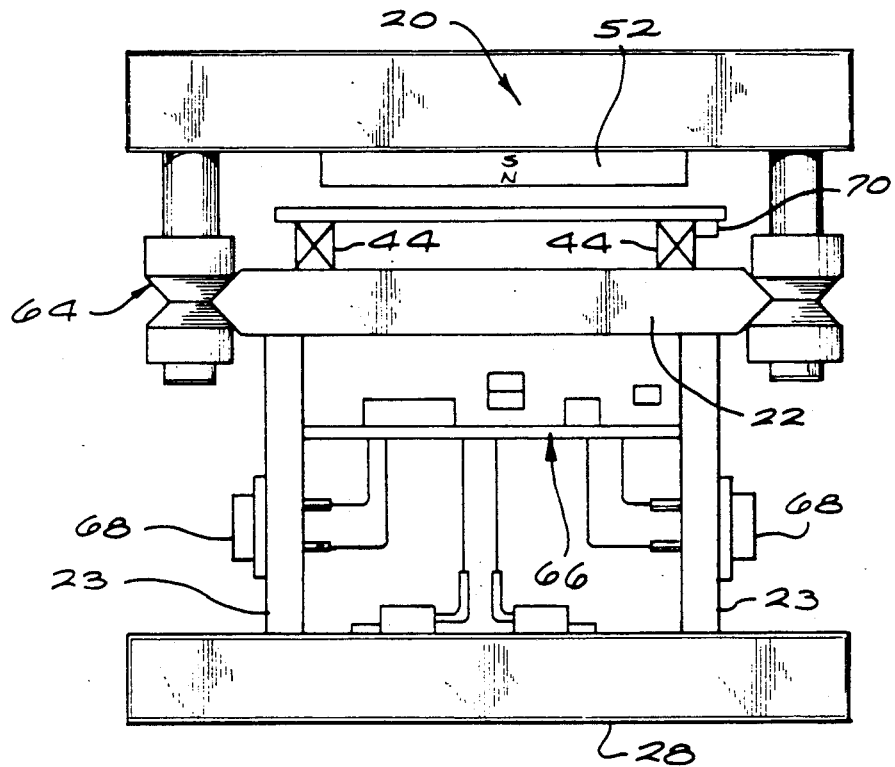
FIG. 7
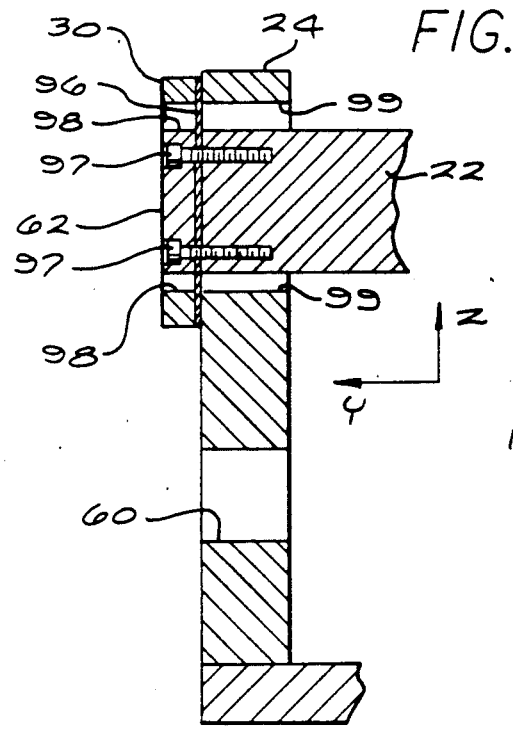
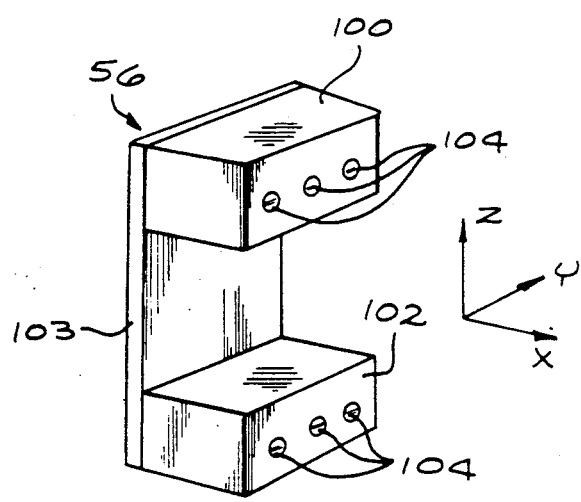
FIG. 8

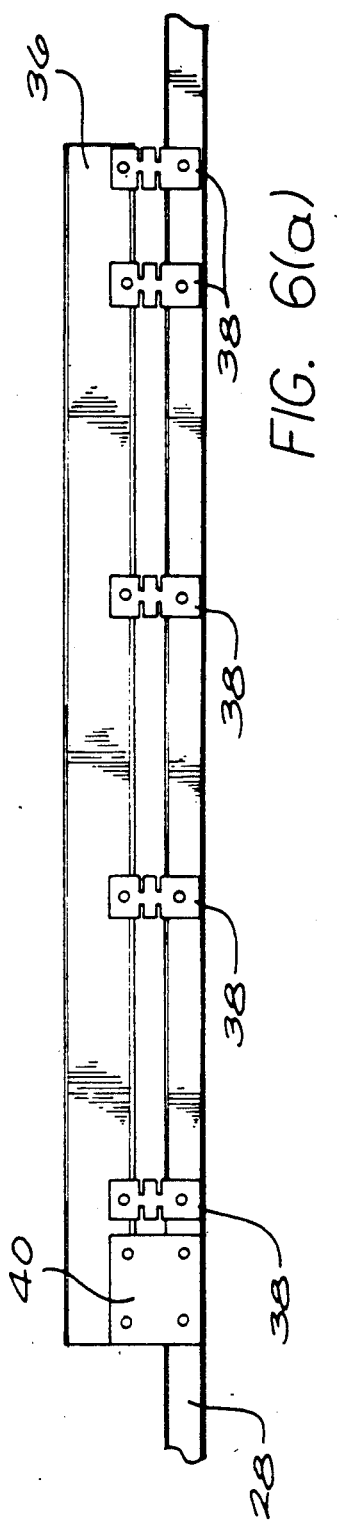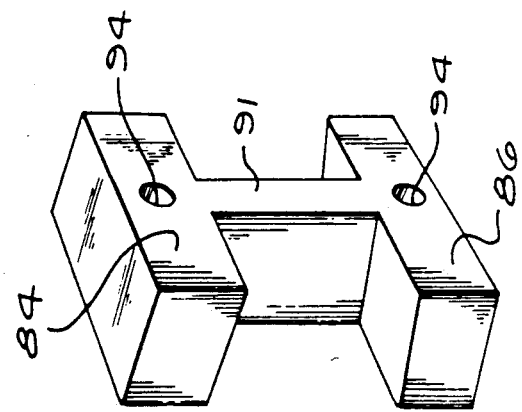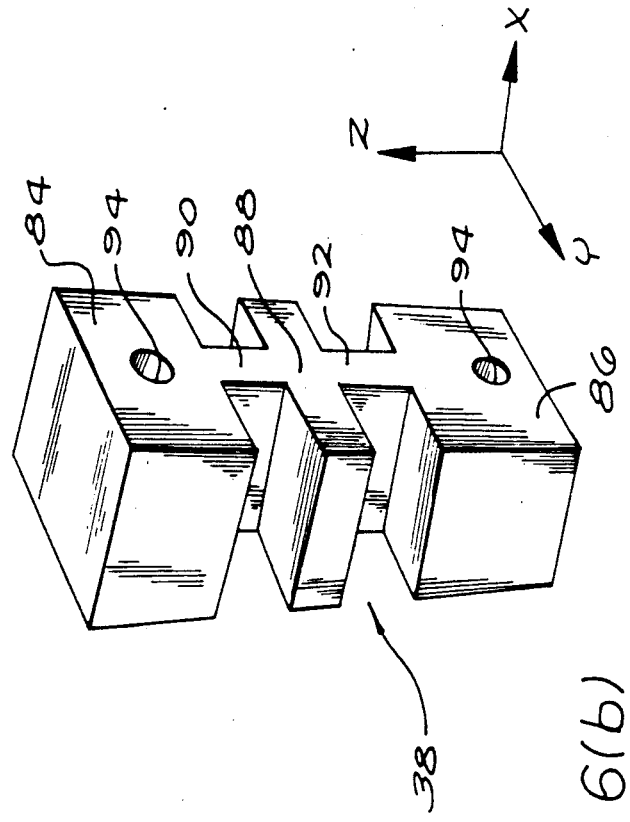
FIG. 6(a)
FIG. 6(b)
FIG. 6(c)

BRUSHLESS LINEAR ACTUATOR WITH SENSOR-ACTIVATED COILS

FIELD OF THE INVENTION

This invention relates to a dc brushless linear actuator in which at least one slide or car is moved electromagnetically along a linear guide rail.

BACKGROUND OF THE INVENTION

The need for high-precision linear actuators is felt in many areas of technology. For example, mechanical positioning systems such as X-Y tables and robotic assembly systems often require a high degree of precision and control of linearly moving members. Several types of linear actuators have accordingly been developed.

Among the simplest types of linear actuators are those in which the motion of a slide is controlled by the rotation of a worm gear, which engages a suitably threaded element in the slide. One advantage of these actuators is that the position of the slide is easily determined, since the slide is held rigidly in place anytime the worm gear is stopped. A major drawback of these actuators, however, is that rotary torque must be converted into a linear motion. This leads not only to transmission losses and heat, but also to noise, mechanical abrasion, and a short life span for the actuator. Furthermore, such purely mechanical actuation is not able to move the slide at the speeds which are desired in many common applications.

Higher slide speeds and greater efficiency are achieved when the slide is driven electromagnetically. In such systems, a series of electromagnetic coils is normally arranged along the guide rail, with either permanent magnets or electromagnets arranged in the slide. By sequentially activating the electromagnetic coils and changing their polarities relative to the polarities of the slide magnets, the slide is moved along the rail. Known systems of this type have two serious shortcomings.

First, in order to activate the coils sequentially with the proper timing and polarity, some means of commutation is necessary. The most common commutation devices in linear actuators include brushes which slide over slip bars or slip ring tracks. Examples of these systems are described in U.S. Pat. No. 4,644,199 (Langley, Feb. 17, 1987); U.S. Pat. No. 4,560,911 (Chitayat, Dec. 24, 1985); and U.S. Pat. No. 4,733,143 (Chitayat, Mar. 22, 1988). Micro-switches instead of brushes are used in the system described in U.S. Pat. No. 4,439,698 (Chen, Mar. 27, 1984). Not only do brushes create transients and deteriorate due to wear, but even were they to function perfectly, both they and micro-switches cause abrupt, transient-like applications of current to, and shut-offs of, current from the coils they control as the slide moves. These abrupt changes of state in turn cause high-voltage reverse electromagnetic forces, which at best create undesirable signal disturbances and at worst damage other components in the system.

The second major shortcoming of existing coil/magnet actuators arises because of the abrupt activation and shut-off of driving coils. Current surges and high-voltage forces both result in wastes of energy, which enters the system as heat. The heat thus generated increases the thermal deformation of parts of the system such as the guide rail and the slide, and the likelihood of deformation makes it impossible to machine these parts to the fine tolerances which are often desired. For example, the tolerances between the slide and the guide rail in a system using air bearings may be as small as a few ten-thousandths of an inch, so that even slight warping of the rail may cause the slide to seize up. The problem of excess heat is particularly acute in systems which activate all the coils at the same time, such as is done in the system described in the abovementioned Langley patent.

It has been suggested, for example, in U.S. Pat. No. 4,789,815 (Kobayashi, et al., Dec. 6, 1988), to use the properties of Hall-effect elements in linear actuators in order sense and control coil polarity. Even this system, however, relies mostly on current-collecting brushes; no known linear actuator has fully utilized the smooth transition in conductance characteristic of Hall-effect elements.

In order for linear actuators to position a slide or table accurately, some device is also needed for accurately determining the location of the moving member on the guide rail. In addition to purely mechanical position encoders, optical encoders are commonly used. These optical encoders, which often include fragile glass elements, are not suitable for use in harsh environments in which dust, humidity, high temperature, and mechanical shocks are common. Optical encoders are also very sensitive to deformations caused by heat, since the gap between their sensing heads and the scales along which they move is extremely small. Furthermore, in linear actuators using position sensing devices such as brushes and switches, the slide or table often over- or undershoots its intended position, once again because of the mainly binary, impulse-like electrical characteristics of the brushes and switches.

SUMMARY OF THE INVENTION

One object of this invention is to provide a brushless linear actuator which is able to operate at high speeds and with close mechanical tolerances and resistance to thermal deformation, while greatly reducing the amount of heat generated by electromagnetic coils in the guide rail, and which eliminates abrupt current surges into and out of the coils.

Yet another object of the invention is to provide means for mounting heat-sensitive elements such as the guide rail and for minimizing the warping effect of heat on such elements.

A further object of the invention is to incorporate in the linear actuator a highly accurate position sensor for the slide which is suitable for use in harsh environments, and which additionally eliminates over- and undershoot of the slide.

These objects are accomplished according to the invention by including in the guide rail a series of Hall-effect elements for sensing the approach and departure of the slide. The Hall-effect elements are distributed according to an optimal pattern and are each connected with at least one electromagnetic coil in the guide rail for gradually and sequentially energizing and shutting-off the coils. The slide includes permanent magnets, and the slide is driven along the guide rail by the magnetic force generated between the permanent magnets and the coils which are energized.

Magnetoresistive sensing elements (such as Hall-effect elements) are also used according to the invention to form a robust position encoder which allows the control system of the actuator to lead the motion of the slide in order to avoid over-and undershoot.

BRIEF DESCRIPTION OF THE DRAWINGS

FIG. 3 is a greatly simplified end view of a representation of the actuator according to the invention;

FIGS. 6(a), 6(b) and 6(c) illustrate a reed mount arrangement for mounting a linear position scale on the actuator, and show two preferred embodiments of reed elements;

FIG. 7 is a cross sectional side view, taken along line VII—VII in FIG. 1(c), of an end reed mounting arrangement for a guide rail;

FIG. 8 is a simplified perspective view of a reed mount for suspending a magnet yoke from the slide according to the invention.

DESCRIPTION OF THE PREFERRED EMBODIMENTS

Figure 1A:
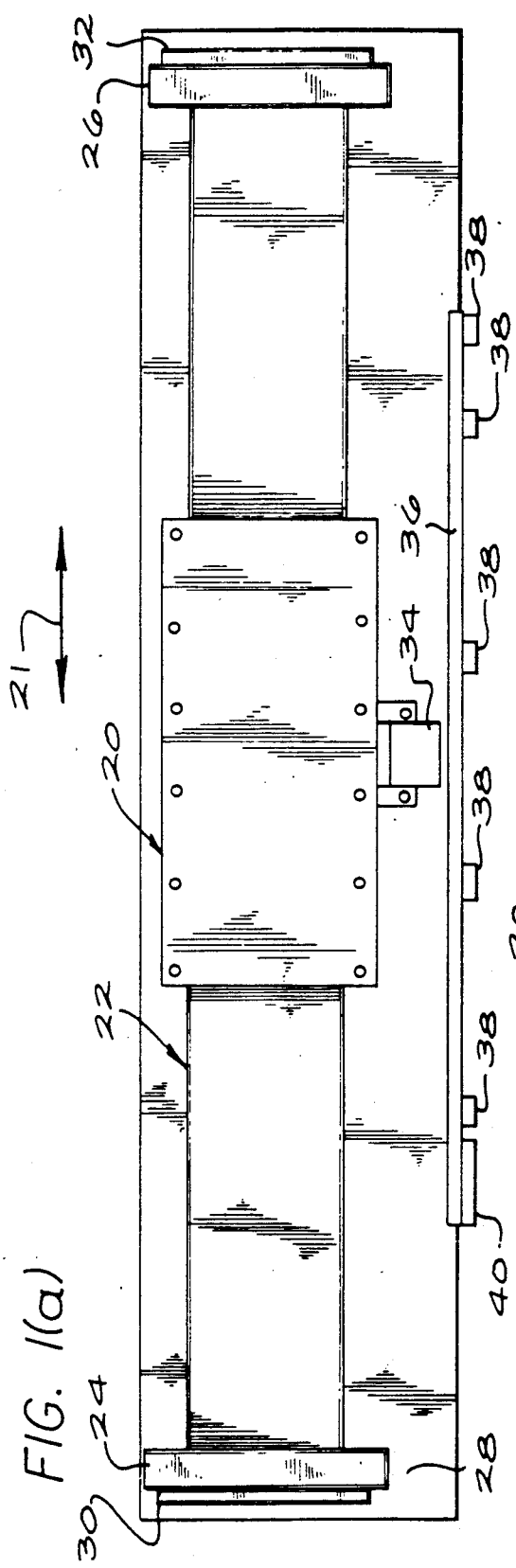
FIGS. 1(a), 1(b) and 1(c) are top, side, and end views, respectively, of a linear actuator according to the invention.

The linear actuator according to the invention is a linear dc brushless motor. The main components of the linear actuator according to the invention are shown in FIG. 1(a). A slide 20, preferably mainly of aluminum or stainless steel, moves in a lengthwise direction (indicated by the arrow 21) on a guide rail 22. Posts 24, 26 support the guide rail 22 on a base 28. Frame-shaped outer end blocks 30, 32, described in greater detail below, are secured to the posts 24, 26. The position of the slide 20 along the rail 22 is determined by an encoder head 34, which is mounted on the slide 20 and which senses position relative to a linear scale 36. The linear scale 36 is secured to the base 28 by means of scale reeds 38, which are located along its length, and by a hard scale mount 40 at one end of the scale. All of these components are described in detail below.

Figure 1B:
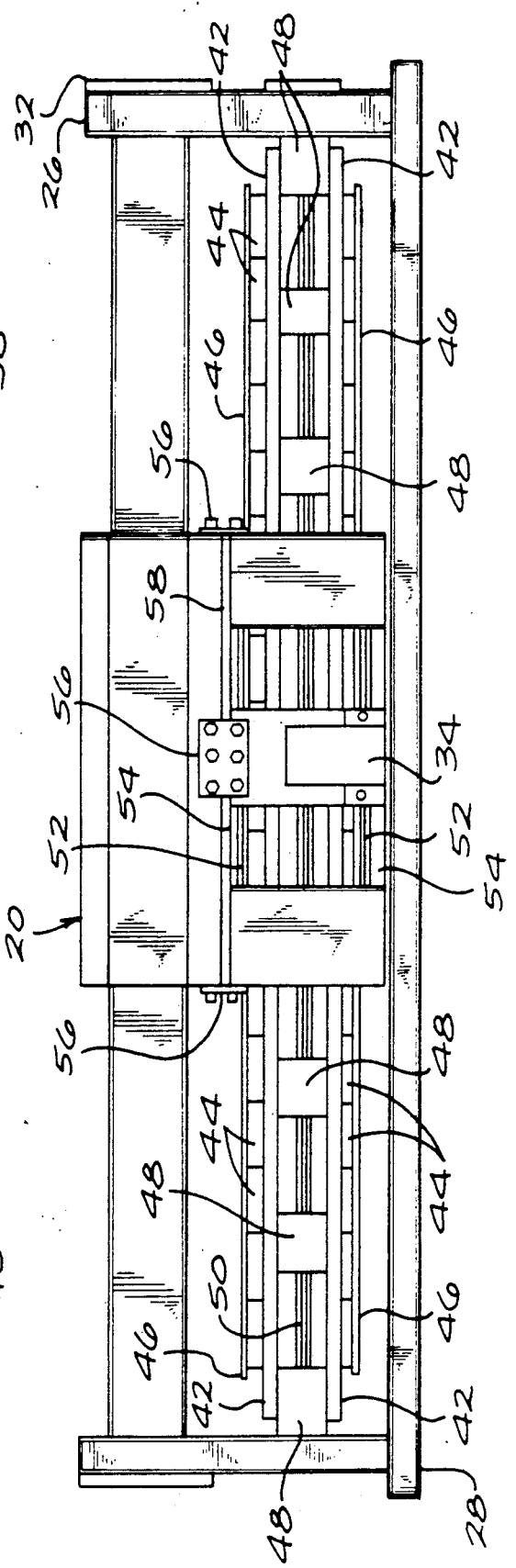

As FIG. 1(b) shows, upper and lower lengthwise extending yokes 42 support upper and lower series of coils 44 (for the sake of clarity, only certain of the coils, which are essentially identical, are marked in FIG. 1(b)). Upper and lower circuit boards 46 are also included to contain wiring and circuitry used for driving the coils. The upper yoke, coils, and circuit board are substantially the same as their lower counterparts. For the sake of simplicity, only one set of yoke, coils and circuit board is described in detail.

Upper and lower sets are preferably included in order to substantially double the magnetic moving force which may be applied to the slide 20, and by using equal and opposite repulsive magnetic forces upward and downward on the slide, to balance the slide vertically and allow for smoother lengthwise running along the rail. Furthermore, if only one set is used, although there is a method by which the upward force of the air pressure in the air bearing balances the downward force of both gravity and the attraction of the permanent magnet(s) to the coil yoke in order to make it possible to manufacture a thinner or smaller linear motor, the unbalanced force created between the coils and permanent magnets may cause the guide rail to deflect and make it difficult or impossible for the slide to move on the rail. Both upper and lower sets are, however, not necessary to enjoy the advantages of the present invention, and other means of suspending or mounting the slide 20 on the guide rail 22 may also be used.

Precise vertical spacing between the yokes 42 is provided by a series of spacing blocks or plates 48. Power supply and control signals to and from the coils 44 are provided through cables 50, which run through the spacing blocks 48. The configuration of spacing blocks 48 and cables 50 shown in FIG. 1(b) is not essential to the invention; other spacing members and cable locations are equally possible as long as the spacing between the yokes 42 is maintained within required tolerances.

The slide 20 includes upper and lower sets of mainly planar permanent magnets 52, which are mounted on a corresponding yoke or yokes 54. The yoke 54 is preferably made of ferro-magnetic stainless steel or iron. Slide reeds 56 are included to attach the encoder head 34 to the slide, and to absorb heat-induced lengthwise expansion of a slide surface 58. The features and advantages of the slide reeds 56 are described below.

FIG. 1(c) is a view of the left end of the actuator shown in FIGS. 1(a) and 1(b). An opening 60 through which the cables 50 may be drawn is preferably provided in the post 24. An inner end block 62, which is described in greater detail below, is mounted within the outer end block 30, with a generally rectangular gap 98 between the two. The inner end block 62 is securely attached to the end of the guide rail 22. The mounting of the inner end block 62 and its cooperation with the outer end block 30 and the guide rail 22 are described below.

Figure 2:
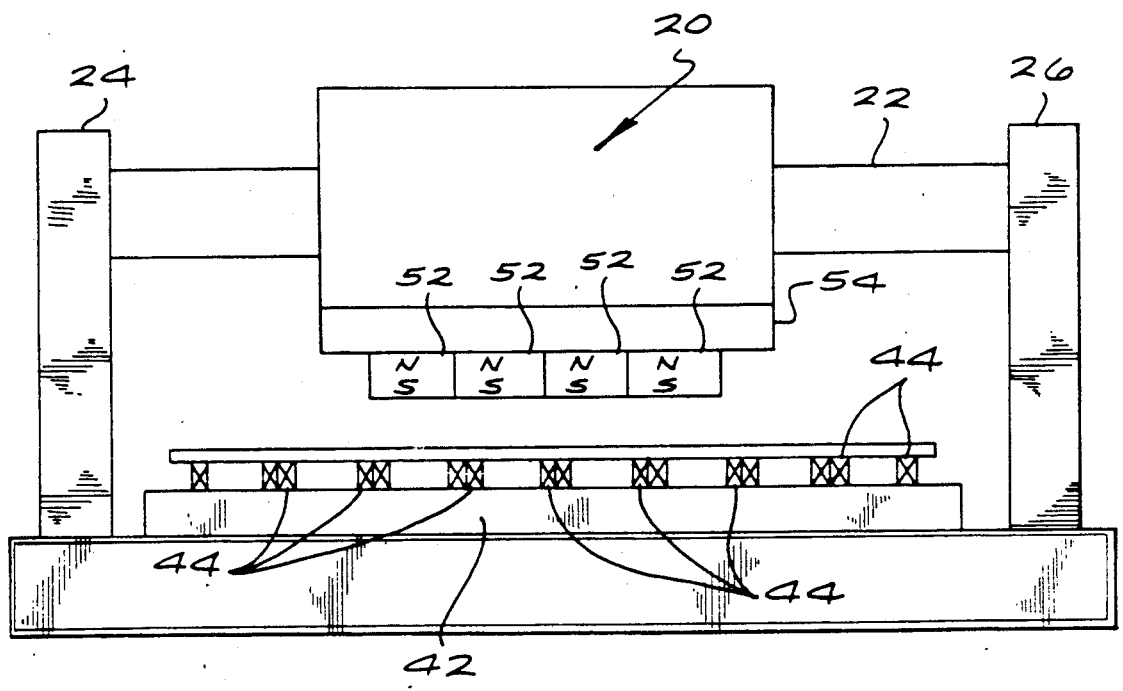
FIG. 2 is a greatly simplified side view of a representation of the actuator according to the invention.

FIG. 2 illustrates in greatly simplified form the way in which the slide 20 is mounted for motion (in the figure, left-right motion) under the influence of the coils 44. In FIG. 2, four permanent magnets 52 are shown, although the number may be varied depending upon the desired size and performance of the actuator. The polarities of adjacent magnets 52 must, however, be reversed. By including the yokes 42, 54 along with their respective elements (the coils 44 and permanent magnets 52), closed magnetic loops are formed. The strength of the magnetic field around each coil/permanent magnet pair is thereby increased approximately 50% compared to an arrangement without yokes, with a corresponding increase in the magnetic force which may drive the slide. The dimensions and positions of the permanent magnets 52 relative to the dimensions and properties of the coils 44 are described in detail below.

FIG. 3 shows a simplified end view of the actuator according to the invention, in which the slide 20 (of which only the upper half is shown) is mounted on the guide rail 22 by means of roller bearings 64. Air bearings, however, instead of the roller bearings, may be used to particular advantage in the actuator according to the invention since not only is the amount of heat generated by the invention less than in prior art actuators, but also the invention provides several features (described below) which greatly reduce the effects of deformation caused by heat. In one prototype of the invention, air bearings were used for the bearings 64, and because of the heat-minimizing characteristics of the invention, a bearing gap of only 3/10000" was possible. The vertical gap between the permanent magnets 52 and the coils 44 may likewise be made extremely small, so that the efficiency of the coil/magnet pairs is greatly increased.

Because of the heat-minimizing features of the invention, amplification and other system control circuitry 66, composed of hybrid integrated circuitry and/or application specific IC, even including power components such as power transistors 68, may be mounted directly under the rail 22. In FIG. 3, both side walls 23 and the base 28, which support the rail 22, act as heatsinks for the power transistors 68.

Furthermore, an amplifier may be included for each individual coil (see FIG. 1(b)), directly adjacent to the coil, without risking thermal deformation. This also greatly reduces the length and amount of cables and wires to and from each coil. Actuators according to the prior art are much more sensitive to heat-induced deformations, and heat-producing coil amplifiers have had to be located at a distance from their respective coils. As a result, in the prior art, as many as four cables have normally been required for each and every coil. In contrast, the low number of cables necessary according to this invention remains the same, regardless of the number of coils used.

Of particular note in FIG. 3 is that Hall-effect elements 70 (referred to below as "Hall elements") are included adjacent to each coil 44 well within the influence of the magnetic field generated by the permanent magnet 52 and between the permanent magnet 52 and the coil 44. The Hall elements 70 are used according to the invention to provide gradual, non-mechanical energizing and shut-off of the coils at a predetermined distance from the slide. The gradual coil activation according to the invention avoids impulsive surges of current into the coils and the sudden collapse of the magnetic field of the coils when they are shut off, and also provides proper timing of coil activation to minimize heat.

The placement of the Hall elements 70 in relation to the coils may not be randomly chosen; rather, proper operation of the slide requires that the Hall elements be located in a specific relationship to the placement of the coils and permanent magnets. The dimensions of the coils and magnets are also dependent upon one another.

Figure 4:
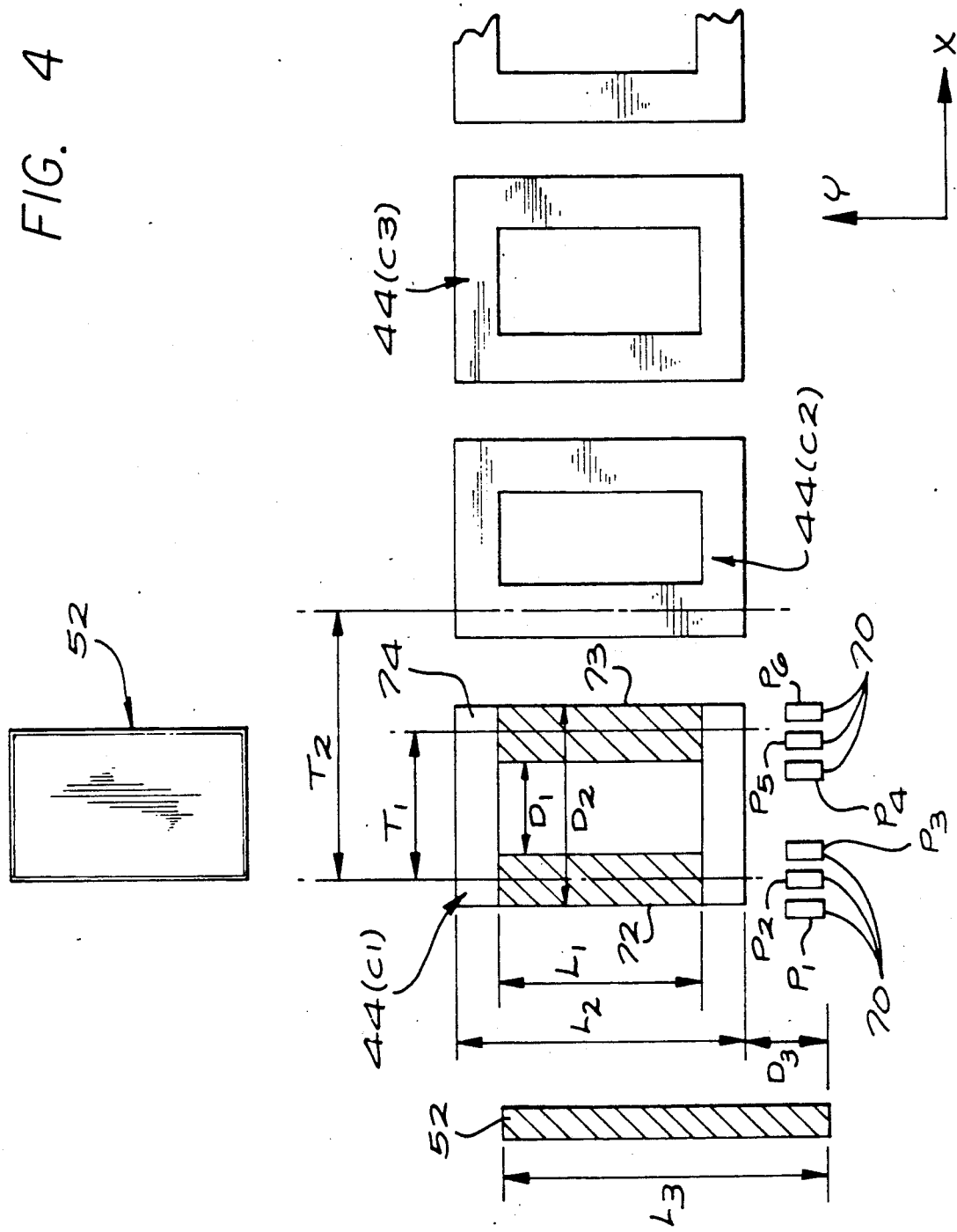
FIG. 4 illustrates the preferred geometry of coils, magnets and sensors, according to the invention.

FIG. 4 illustrates the geometry of the coils, slide magnets and Hall elements according to the invention. As an aid to understanding FIG. 4, orthogonal coordinate axes X and Y are indicated. Also for the sake of clarity, a plan view and a side view of one permanent magnet 52 are shown, respectively, above and to the left of a detailed geometric representation of one coil 44, with other coils 44 being indicated in outline to the right of this one coil. Although the coils 44 are all substantially identical, in order to aid understanding of the following description of the coil/magnet geometry and of the placement of Hall elements 70, the left-most coil in FIG. 4 has also been marked C1, with the coil immediately to its right being marked C2 and the coil to the right of C2 being marked C3. As the slide moves over the coil C1, viewed from above (looking into the plane of FIG. 4), the magnet 52 will cover the coil; it is shown to one side only for the sake of geometric comparison.

As FIG. 4 shows, the coil 44 comprises windings 72, 73 and 74 on the ferromagnetic yoke 54 (See FIG. 1(b)). The inner diameter of the coil C1 (measured in the X-direction) is marked D1 in FIG. 4, with the outer diameter being marked D2. The inner length of the coil C1 (measured in the Y-direction) is L1, with the outer length being marked L2. The outer length L2 of the coil is predetermined according to the size of the guide rail 22 and/or the width of the permanent magnets 52 on the slide 20. The effective coil width, also known as the effective coil diameter, is marked T1. The effective coil width T1 is the distance in the X-direction between the approximate centerlines of the yoke arms under each of the windings 72, 73; thus T1=(D1+D2)/2.

The width of the permanent magnet 52 (illustrated above the coil C1) is equal to the effective coil width T1 in order to fully cover the coil without extending over an adjacent coil and thereby lessening or negating the magnetic force of the coil C1 on the magnet 52 when the coil is activated. The direction of polarization of the magnet 52 is in the Y-direction. In FIG. 4, the magnet 52 is shown as being polarized with the direction from the front to the back of the sheet. Adjacent permanent magnets must have polarities which are inverted relative to one another.

In FIG. 4, six Hall elements 70 are illustrated in positions P1-P6, respectively. In positions P1 and P6, the Hall elements are centered under the outermost (in the X-direction) left and right edges, respectively, of the coil C1. In positions P2 and P5, the Hall elements are centered under the extended centerlines of the left and right windings 72, 73, respectively. In positions P3 and P4, the Hall elements are centered under the left and right interior edges, respectively, of the coil C1. One single Hall element 70 per coil 44 suffices according to the invention, and this Hall element may be positioned at any of the positions P1-P6. According to this invention, one Hall element must be mounted between positions P1 and P3, inclusive, or between positions P4 and P6, inclusive. Six Hall elements are shown in FIG. 4 only to illustrate the typical positions.

All Hall elements must, however, be located at the same position (one of P1-P6) relative to their respective coils once the position for one has been chosen. By maintaining a constant relative position of the Hall elements with respect to their respective coils, the phase difference between each Hall element and its associated coil is also maintained constant. The Hall elements 70 are preferably mounted as close as possible in the Y-direction to their associated coils 44 without coming into direct physical and electrical contact with them. As viewed in FIG. 4, the distance from the lowermost edge of the coil 44 to the lowermost portion of the Hall element 70 is designated D3. The distance D3 should thus be minimized. The length L3 of the permanent magnet 52 (see the side view of the shown to the left of the coil C1) is preferably equal to or greater than L2+D3 so that the magnet is able to cover both the coil and the associated Hall element fully.

An important, advantageous feature of the invention is the pitch between adjacent coils 44. In FIG. 4, this coil pitch is designated T2, and it is chosen according to the following expression:

$$T2 = (2 \cdot T1 \cdot n)/m$$

In the expression, m is a positive integer phase simulation constant equal to the type of phase the actuator according to the invention is intended to simulate. For example, if the actuator is to simulate a 3-phase motor, m is chosen equal to three; for a 4-phase motor, m=4.

Likewise, n is a coil positioning integer constant which may be chosen independent of m. The constant n indicates with what pitch the coils are positioned. According to this invention, all the coils must be located with the pitch T2 as defined above. The pitch of the Hall elements is also equal to T2.

Although the constants m and n may be chosen independently, once they are chosen and the effective coil width T1 is determined, the coil pitch T2 remains constant. In certain applications, however, it may be desireable not to minimize T2 but rather to choose a larger value for n and thus increase the coil pitch. In this way, additional space may be created between the coils in order to make room for additional sets of overlapping coils and thereby to increase the moving force on the slide.

As the magnetic field of the permanent magnet 52 approaches the Hall element, the element will begin to increase its Hall-voltage. The coil control circuitry senses the voltage of the Hall element and begins to allow current to flow through the coil C2. As the permanent magnet approaches the Hall element, the Hall-voltage of the element increases until it reaches a maximum approximately when the permanent magnet is over it and the coil C1. The current passed to and through the coil C2 is thereby also at a maximum, and the slide is pulled to the right. The constant n is also chosen according to the degree of "lead" desired for coil activation: the greater n is chosen to be, the farther in advance of slide passage a coil will be activated, depending on the necessity for "remote" coil control.

In order to control a coil, a dc supply voltage is applied over the associated Hall element. The output voltage from the Hall element, which is a function of the supply voltage and the strength of the magnetic field applied to the Hall element, is amplified by suitable conventional power amplifiers in order to generate the supply current to the coil. The supply voltage to each Hall element is provided by a controller, that is, by the coil control circuitry. Note that the direction in which the slide is forced electromagnetically depends on the polarity of the coils, and that the polarity of the output voltage from a Hall element depends also on the polarity of the dc supply voltage. The controller may therefore set the polarity of a given coil by supplying the associated Hall element with a voltage of the proper polarity.

The timing and direction of the sequential coil activation in order to move the slide with a chosen velocity along the slide is determined by the coil control circuitry. The sequential activation and deactivation of the coils may be controlled in a substantially conventional manner; however, by sensing the voltage of the Hall-elements as explained above, the control circuitry will be able to lead the motion of the slide more effectively, with no abrupt current surges. Smooth and heatminimizing slide movement is further provided by activating each coil to a degree proportional to the voltage of the Hall element which controls that coil.

Since more than one permanent magnet is preferably provided on the slide, with each extending at least part way over a coil, several coils will normally be fully or partially activated to move the slide. Coils (and consequently, Hall elements) which are so far away that the magnetic fields of the permanent magnets do not yet influence them will not be activated. One additional benefit of the Hall elements is thus that no complicated control circuitry is needed to insure that distant coils are kept deactivated so as not to generate heat unnecessarily. Furthermore, because coil current according to the invention is a function of the gradually increasing and decreasing voltage of the Hall elements, and not of binary devices such as mechanical switches, no current pulses are applied to the coils 44; also, the energy in activated coils is released gradually as the voltage of the respective controlling Hall elements decreases as the slide passes over these elements.

Referring to FIG. 4, a first effective coil area is defined as the cross-sectional area of the coil 44 covered by the left winding 72. A first effective coil area is approximately equal to L1·(D2−D1)/2. A second effective coil area is similarly defined as the area of the coil 44 covered by the right winding 73. The length of the effective coil areas, that is, the inner length L1, is determined by the necessary moving force to be generated by each coil, with a greater length increasing the force.

According to the invention, the first effective coil area is active based on Fleming's left-hand law. Consequently, the second effective coil area must have both an inverted magnetic field and a reversed current direction relative to those in the first effective coil area in order for the second effective coil area to produce a moving force on the slide in the same direction as that of the first. Accordingly, when the polarity of the magnetic field is reversed, the polarity of the output signal from the Hall elements is inverted. As the slide passes over Hall elements and the polarity of the magnetic field sensed by the elements changes, the polarities of the output signals from the Hall elements change accordingly. This property of automatic, non-mechanical polarity reversal in the Hall elements makes it possible to control coil polarity without the need for brushes or other mechanical contact devices or sensors.

According to the invention, one or more secondary Hall elements (not shown in the figures) are preferably provided adjacent to chosen ones of the coils 44 near either end of the guide rail 22. These secondary Hall elements may be the same as the coil-controlling Hall elements already provided adjacent to each coil, or they may be included separately. As the slide approaches the end of the guide rail, the secondary Hall elements at that end will sense the magnetic field of the permanent magnets on the slide and will begin to increase their Hall-voltage. The Hall-voltage of these secondary Hall elements is used to create a stop signal. Upon sensing the stop signal, the system control circuitry stops the slide. The optional secondary Hall elements thus serve to protect the actuator from being damaged by too far slide travel by providing end-of-slide signals.

Figure 5A:
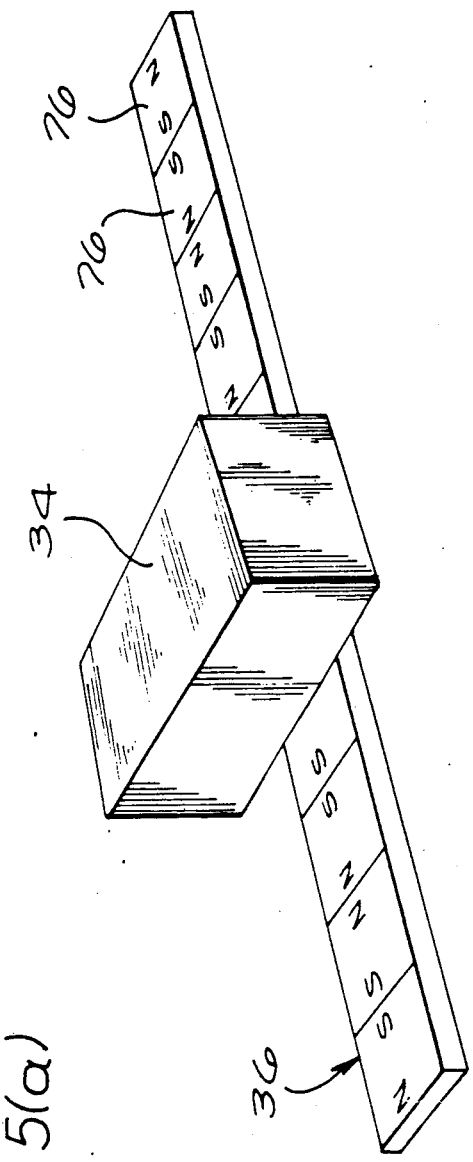
FIGS. 5(a) and 5(b) are simplified representations of a linear position encoder and two embodiments of a scale according to the invention.
Figure 5B:
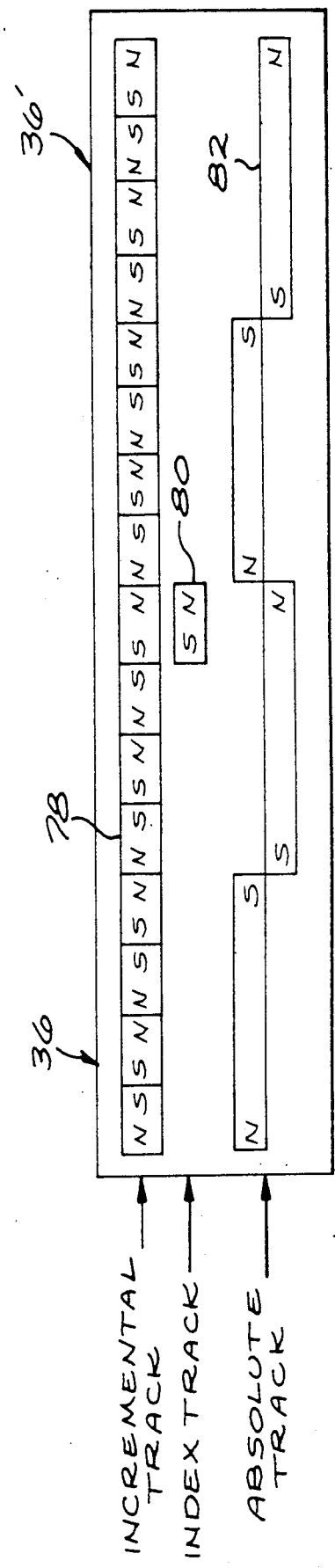

Preferred means for allowing precise determination of the position of the slide are illustrated in FIGS. 5(a) and 5(b). FIG. 5(a) illustrates the encoder head 34 on a simple embodiment of a magnetic linear encoder, which also includes the linear scale 36. In this simple embodiment, the linear scale is single-track and is divided into or includes a plurality of magnetic regions 76, of which, for the sake of simplicity, only two are marked. As FIG. 5(a) indicates, the direction of polarization of each magnetic region is reversed relative to that of adjacent fields, with the direction of polarization of each magnetic region preferably being either parallel or perpendicular to the lengthwise direction of the scale 36, that is, to the direction of motion of the slide on the guide rail.

The encoder head 34 includes at least one magnetoresistive sensor (not shown) or other Hall elements. The polarity of the output signal generated by the magnetoresistive sensor will invert each time the element passes a boundary between two adjacent magnetic regions on the scale 36. The control circuitry of the actuator senses and counts these reversals of polarity in the output signal from the magnetoresistive sensor. By comparing the count of reversals, which is directly related to the number of magnetic regions the encoder head has passed, to an origin for the slide, the position of the slide is easily determined with a precision directly related to the pitch of the magnetic regions.

FIG. 5(b) illustrates a more refined embodiment of the magnetic linear encoder. In this embodiment, the linear scale 36 includes an incremental track 78, an index track 80, and an absolute track 82. The encoder head includes at least one magnetoresistive sensor or other Hall elements to sense each of these three tracks. The incremental track 78 is substantially equivalent to the single track shown in FIG. 5(a). The index track is mostly non-magnetized, but includes at least one magnetized region. Each magnetized region of the index track serves as both a quasi- and an absolute origin marker for control circuitry in determining the position of the slide along the guide rail. The quasi-origin marker is preferably included at a predetermined distance from an absolute origin position of the slide.

The slide may often be moving at a high speed and with considerable force, and the position tracking circuitry may be disturbed. In order to avoid too rapid deceleration of the slide and to provide precise stopping at the absolute origin when the slide is commanded to the absolute origin, when the encoder head senses the quasi-origin marker of the index track, it sends a signal to the control circuitry, which then begins deceleration of the slide. The deceleration may be precisely controlled by measuring the motion of the slide against the finely divided incremental track 78, so that the slide will stop at the absolute origin without unnecessary over- or undershoot. The absolute track 82 is not gradated relative to the quasi-origin markers, but rather the control circuitry counts polarity changes of the absolute track from the absolute origin.

Furthermore, if the width of each magnetized region of the absolute track is made equal to the pitch of the coils, by counting polarity reversals along the absolute track, the control circuitry can easily determine at which coil the slide is located. Prominent advantages of the magnetic linear encoder over traditional optical position encoders are: 1) the magnetic encoder is less sensitive to the distance between the scale 36 and the encoder head 34, so greater mechanical tolerances may be used without sacrificing precision; and 2) the magnetic encoder is much better able to tolerate a harsh environment such as those having high temperatures, dust, humidity, mechanical shock, etc. The magnetic encoder may, however, be used in conjunction with a traditional optical encoder if desired. For example, one might choose to include only the index and incremental tracks in order to control deceleration of the slide while retaining an optical encoder for position determination alone.

Although the tolerances between the encoder head and the linear scale according to the invention may be smaller than in conventional devices, it is still important for the linear scale 36 to be kept as straight as possible, since even the encoder head according to the invention cannot properly detect the magnetic regions of the various scale tracks if the scale is too warped. When a conventional optical encoder is used, the need to avoid scale deformation is even greater.

Figure 1:
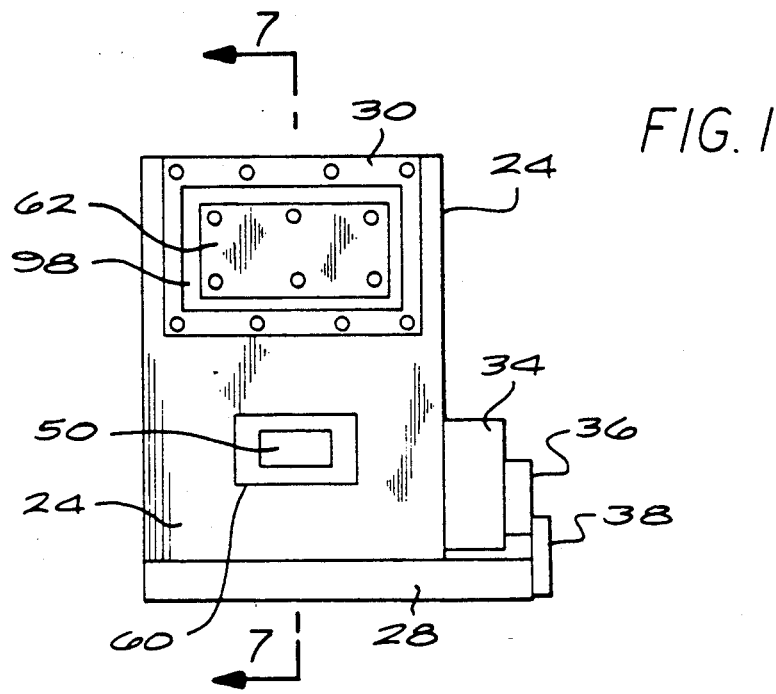

FIGS. 6(a) and 6(b) illustrate, respectively, the general means of mounting the linear scale 36 on the base 28, and a view in isolation of a preferred embodiment of one of the scale reed mounts 38 according to the invention. As was pointed out above, it is important that the linear encoder scale 36 be kept straight, since warping sufficient to close the preferably small gap between the encoder head 34 (see FIG. 1) and the linear scale 36 will hinder the motion and accurate performance of the position encoder. According to the invention, therefore, thermal stress is allowed to deform the linear scale by causing it to extend in the longitudinal direction (the direction of motion of the slide on the guide rail), but the scale is prevented from warping. As FIG. 6(a) shows, a hard block mount 40 at one end of the linear scale 36 rigidly attaches that end of the scale to the base 28. The partially flexible scale block reed mounts 38, however, secure the scale to the base at several points along the length of the scale.

FIG. 6(b) is an enlarged perspective view of a single scale reed mount 38, and includes a set of coordinate axes for the sake of clarity. Each reed mount 38 is shaped substantially as an "I" with upper and lower cross portions 84, 86 extending, in an unstressed state, in the Y-direction (longitudinal direction of the linear scale and the direction of motion of the slide), but also with a central cross portion 88 which, in the unstressed state, extends parallel to the upper and lower cross portions. Upper and lower waist portions 90, 92 extend mainly in the Z-direction (upward in FIG. 6(a)) and connect the central cross portion 88 with the upper and lower cross portions 84, 86, respectively. The waist portions 90, 92 form the actual reeds of the mount 38 and are much narrower in the Y-direction than any of the cross portions. Finally, a fastener hole 94 is provided in each of the upper and lower cross portions 84, 86. The upper cross portion 84 is fastened, preferably by screws, to the linear scale 36, with the lower cross portion 86 being similarly fastened to the base 28.

FIG. 6(c) shows a simplified but, in many applications, fully satisfactory, second embodiment of the scale reed mount, in which the central cross portion 88 (see FIG. 6(b)) has been eliminated and the two waist portions 90, 92 are replaced by a single waist portion 91. The simplified scale reed mount thus is "I"-shaped, and is able to bend and absorb lengthwise expansion of the linear scale, but lacks the improved heatdissipating ability provided by the central cross portion 88.

When the linear scale expands in the Y-direction, that is, lengthwise, the reed mount 38 will easily absorb the shearing force thus created, since the mount is able to bend easily and resiliently at the waist portions 90, 92. Any warping or other force with a component in the X-direction will, however, be strongly resisted because of the uniform and relatively great thickness and stiffness (in the X-direction) of all portions of the reed mount 38.

The dimensions of the reed mount 38 may be varied and chosen for each application based on a number of factors. Greater stiffness in the X-direction is achieved primarily by increasing the thickness (in the X-direction) of the upper cross portion 94, and by shortening the height (in the Z-direction) of the upper waist portion 90. Increased flexibility of the mount in the Y-direction, and thus greater ability to absorb lengthwise thermal expansion of the linear scale, is accomplished primarily by decreasing the width (in the Y-direction) of the lower waist portion 92 relative to the width of the central and lower cross portions 88, 86, respectively. The height (in the Z-direction) of the central cross portion 88 is determined depending on how far above the base the linear scale is to be mounted. As an added advantage of the scale reed mount 38 according to the invention, the central cross portion 88 also serves as a heat sink to further lessen the tendency of the linear scale to deform due to heat.

Just as warping of the linear scale must be avoided to allow free travel of the encoder head along the scale, it is also important to be able to eliminate the risk of warping of the guide rail, so as to ensure free travel of the slide along the rail even with very small tolerances. This is especially so when the slide is mounted on the rail using air bearings as according to this invention, since the gap will typically be on the order of two to four ten-thousandths of an inch.

FIG. 7 illustrates a rail end reed mount according to the invention. With reference also to FIGS. 1(a) and 1(c), according to the invention, a thin metal reed plate 96, preferably of brass, aluminum or other suitable metal, is clamped, preferably using screws, both between the outer block 30 and the post 24, and also between the inner block 62 and the guide rail 22 (preferably using screws 97). The end of the guide rail 22 is thereby suspended within a substantially rectangular opening 99 in the post 24. The gap 98 and the opening 99 thus together form a substantially rectangular channel extending in the lengthwise (Y-) direction on either side of the frame-like portion of the reed plate 96 between, on the one hand, the post 24 and the outer end block 30, and, on the other hand, the guide rail 22 and the inner end block 62.

The reed plate 96 is very rigid in all directions except the Y-direction. However, as the guide rail 22 expands thermally in the Y-direction, the reed plate 96 flexes outward, that is, in the positive Y-direction (defined as shown in FIG. 7); viewed as in FIG. 7, the inner end block 62 is thereby "pushed" to the left relative to the outer end block 30. Thermal stress (which is reduced by the other heat-reducing features of this invention) will therefore be released through lengthwise expansion of the guide rail 22 rather than through warping.

It is also important to avoid warping of the slide 20. Thermal expansion must also be absorbed between the slide and the yoke(s) 54, since these parts will normally be made of different metals and will therefore have different coefficients of expansion. FIG. 8 shows a preferred embodiment of the reed mounts 56 according to the invention. Upper and lower generally right-prismatic block portions 100, 102, respectively, are joined by a thin metal reed plate 103, which is preferably made of brass, aluminum, or stainless steel. FIG. 1(b) shows the general orientation of the reed mounts 56, which is such that the upper and lower block portions 100, 102 extend outward away from the slide 20 and yokes 54, with the reed plate 103 generally vertical.

A reed mount 56 is preferably provided on each of the four sides of the slide 20, with the upper block portion 100 of each being securely fastened to the slide 20 and with the lower block portion 102 of each being securely fastened to the yoke 54. The reed mount 56 is preferably fastened using screws 104 or other suitable rigid fasteners which extend through the block portions 100, 102. In FIG. 8, a set of coordinate axes, relative to the reed mount 56, is included for an arbitrary one of the reed mounts. Relative thermal expansion of the slide 20 and the yoke causes a shearing force which is almost entirely in the X-direction. The reed mount 56 easily and resiliently absorbs this shearing force as the thin reed plate 103 bends.

Forces in the Y- or Z-directions, however, will be strongly resisted and will cause negligible deformation because of the rigidity of the plate 103 in these directions. The principle Z-directional force on the plate is the weight of the yoke 54 and its attached permanent magnets 52. The yoke and the magnets are therefore securely suspended from the slide surface 58 by the reed mount 56, in particular, by the plate 103. This suspension has two distinct advantages. First, because the slide 20 and yoke 54 are not in direct contact, the metals chosen for each may be dissimilar, with less regard for differences in the thermal coefficients of expansion than would be the case if these two parts were mounted touching each other. Second, the gap (which depends on the chosen height of the metal plate 103) between the slide and the yoke provides for air cooling and further reduces the problem of thermal expansion and possible warping.

Figure 9:
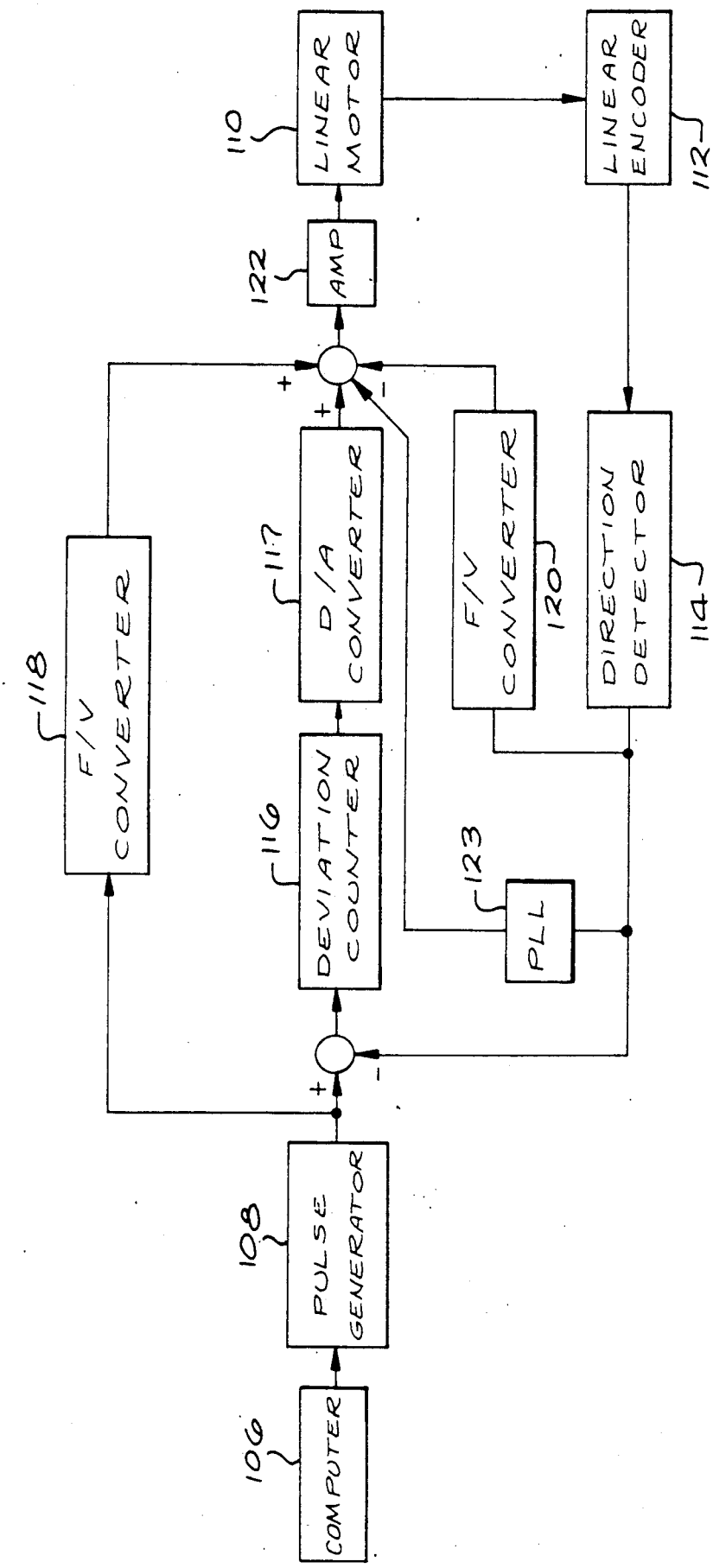
FIG. 9 is a block diagram of a position and velocity control circuit according to the invention.

FIG. 9 is a block diagram of a position and velocity control circuit according to the invention, which allows the slide to execute either a stepping motion or to run smoothly A computer 106 directs a pulse generator 108 to output a stream of pulses of one of two types according to whether forward or backward motion of the slide is desired. The position of a linear motor 110, corresponding to the slide and attached magnets, yokes, etc., is sensed by a linear encoder 112, which corresponds to the encoder head and scale. As the linear motor moves, the linear encoder generates at least one output signal with a frequency which is proportional to the velocity of the motor, and with a phase difference relative to an internal clock (not shown) which depends on the direction of movement of the motor. The linear encoder may also include signal-shaping circuitry such as square-wave formers; alternatively, such signal-shaping circuitry may be connected externally.

A direction detector 114 converts the asynchronous output signals from the linear encoder 112 into preferably square-wave output signals which are synchronized relative to a system clock with the output signals from the pulse generator 108. The output signal (that is, the frequency of its pulses) from the direction detector 114 is subtracted from the output signal from the pulse generator 108. This differential pulse signal is applied to a deviation counter 116, which outputs a digital signal having a frequency proportional to the differential pulse signal. The digital signal is in turn converted to an analog dc voltage signal by a D/A converter 117.

The outputs from the pulse generator 108 and the direction detector 114 are also connected directly to frequency-to-voltage (F/V) converters 118 and 120, respectively. The analog output from the F/V converter 120 and an output signal from a phaselocked loop circuit 123 (described below) are subtracted from the sum of the analog outputs of F/V converter 118 and D/A converter 117 in order to form a driving signal which is amplified in an amplifier 122 and applied to the linear motor, that is, to the control circuitry which selects, activates and drives the coils.

FIG. 9 also shows the phase-locked loop (PLL) circuit 123. The PLL circuit generates a feedback signal synchronized with both the linear encoder and a quartz oscillator (not shown). The PLL circuit decreases a "hunting" generated at the subtraction point when the analog output from the F/V converter 120 has a little ripple in its signal. As a result, the driving voltage to the amplifier 112 increases or decreases smoothly and the slide 20 does not cause any drifting or overrunning when stopping.

The invention is of course not limited to the specific embodiments described above. Several design parameters, such as the number and placement of coils, the number of permanent magnets on the slide, the dimensions of the various reed mounts, etc., as well as possible alternative materials and arrangements of certain components have been set forth above. All of these variations are encompassed by the following claims. In addition, because of the heat-minimizing and warp-eliminating features of the invention, it is fully possible to include more than one slide on the guide rail. This invention is particularly advantageous in a multi-slide actuator, since the Hall elements allow activation of only the coils near each slide, the energy wasted, that is, the heat generated unnecessarily, by the coils is greatly reduced.

What is claimed is:

1. A brushless dc linear actuator comprising:
   a guide rail extending in a longitudinal direction;
   at least one moving member, each of which is movable along the guide rail in the longitudinal direction and includes a plurality of permanent magnets;
   electromagnetic drive means for driving the moving member forward and backward along the rail, said drive means including at least one series of electromagnetic coils secured to the guide rail and distributed longitudinally along the guide rail with a predetermined pitch; and
   Hall-effect means, secured to the guide rail and including one Hall-effect element adjacent to each coil, for brushless, non-impulsive, gradual energization and shut-off of active ones of the coils within a predetermined distance of the permanent magnets of the moving member.

2. A linear actuator as defined in claim 1, each said Hall-effect element being located at a fixed, predetermined position relative to the coil to which it is adjacent for maintaining a constant phase difference between each said Hall-effect element and the coil.

3. A linear actuator as defined in claim 1, in which each said permanent magnet has a width (T1) which is equal to the average distance between an inner diameter (D1) and an outer diameter (D2) of each coil, and in which the pitch (T2) of the coils is related to the width (T1) of the permanent magnets according to the expression:

$$T2 = (2 \cdot T1 \cdot n)/m,$$

where m is a predetermined phase simulation constant and n is a predetermined coil positioning constant.

4. A linear actuator as defined in claim 1, including magnet yoke means, including unitary yoke reed mounts, for maintaining the permanent magnets at a constant vertical distance from and parallel to the series of coils; and for dissipating heat from and for resiliently absorbing thermal expansion forces of magnet yokes.

5. A linear actuator as defined in claim 1, in which each said moving member is mounted on said guide rail by air bearings for contact-free motion along the guide rail.

6. A linear actuator as defined in claim 1, including position and velocity control means, which comprises:

a computer for generating positional and directional command signals as a series of pulses;
position encoder means, including at least one magnetoresistive element, for sensing the position of said moving member relative to said guide rail and for creating a position signal corresponding to the sensed position; and
deviation and amplification means for generating a moving member drive command signal proportional to said command signals and said position signal.

7. A linear actuator as defined in claim 6, in which each magnetoresistive element is a Hall-effect element.

8. A linear actuator as defined in claim 1, including rail support means for supporting each end of the guide rail and for holding the guide rail substantially horizontal, said rail support means including substantially vertical end posts and rail reed means for flexibly absorbing longitudinal expansive forces of the rail and for lessening rail warping.

9. A linear actuator as defined in claim 8, in which said rail reed means includes, at at least one end of said rail:
   an inner end block;
   an outer end block;
   a reed plate;
   one end of said rail extending into a rail opening in said end post to form a channel around the end of the rail;
   said inner end block clamping an inner portion of said reed plate to said rail;
   said outer end block clamping a perimeter portion of said reed plate to said end post; and
   said reed plate being flexible in the longitudinal direction, suspending the end of the rail within the rail opening, and restraining vertical motion of the end of the rail.

10. A brushless dc linear actuator comprising:
    a guide rail extending in a longitudinal direction;
    rail support means for supporting each end of the guide rail and for holding the guide rail substantially horizontal;
    said rail support means including substantially vertical end posts and rail reed means for flexibly absorbing longitudinal expansive forces of the rail and for lessening rail warping;
    said rail reed means including, at at least one end of said rail:
    an inner end block;
    an outer end block;
    a reed plate;
    one end of said rail extending into a rail opening in said end post to form a channel around the end of the rail;
    said inner end block clamping an inner portion of said reed plate to said rail;
    said outer end block clamping a perimeter portion of said reed plate to said end post; and
    said reed plate being flexible in the longitudinal direction, suspending the end of the rail within the rail opening, and restraining vertical motion of the end of the rail;
    at least one moving member, each of which is movable along the guide rail in the longitudinal direction and includes a plurality of permanent magnets;
    electromagnetic drive means for driving the moving member forward and backward along the rail, said drive means including at least one series of electromagnetic coils distributed longitudinally with a predetermined pitch; and Hall-effect means, including one Hall-effect element adjacent to each coil, for non-impulsive, gradual activation and shut-off of active ones of the coils within a predetermined distance of the permanent magnets of the moving member.

11. A brushless dc linear actuator comprising:

a guide rail extending in a longitudinal direction;

rail support means for supporting each end of the guide rail and for holding the guide rail substantially horizontal;

said rail support means including substantially vertical end posts and rail reed means for flexibly absorbing longitudinal expansive forces of the rail and for lessening rail warping;

said rail reed means including, at at least one end of said rail:

an inner end block;

an outer end block;

a reed plate;

one end of said rail extending into a rail opening in said end post to form a channel around the end of the rail;

said inner end block clamping an inner portion of said reed plate to said rail; p1 said outer end block clamping a perimeter portion of said reed plate to said end post; and said reed plate being flexible in the longitudinal direction, suspending the end of the rail within the rail opening, and restraining vertical motion of the end of the rail;

at least one moving member, each of which is movable along the guide rail in the longitudinal direction and includes a plurality of permanent magnets; and electromagnetic drive means for driving the moving member forward and backward along the rail.

12. A linear actuator as defined in claim 6, in which the position encoder means includes:

a magnetically encoded, longitudinally extending scale substantially parallel to the guide rail, said scale including a series of magnetized regions of alternating polarity; and an encoder head, secured to the moving member, on which the at least one magnetoresistive element is mounted adjacent to the scale for sensing changes in polarity of the magnetized regions as the moving member moves relative to the scale.

13. A linear actuator as defined in claim 12, in which each magnetoresistive element is a Hall-effect element.

14. A linear actuator as defined in claim 6, further including a stationary member extending in the longitudinal direction, and in which the position encoder means includes:

a linear scale extending in the longitudinal direction; and scale reed means for attaching the linear scale to the stationary member for dissipating heat from and for absorbing longitudinal expansive forces of the scale and for lessening scale warping upon expansion.

15. A linear actuator as defined in claim 14, in which the scale reed means includes a plurality of reed mounts, each reed mount having a waist portion extending substantially perpendicular to the longitudinal direction, and a plurality of mainly parallel cross portions extending in the longitudinal direction on either side of the waist portion.

16. A linear actuator as defined in claim 15, in which each reed mount has three cross portions.

17. A linear actuator as defined in claim 15, in which each reed mount is shaped generally as an "I" with two cross portions and a single waist portion.

18. A linear actuator as defined in claim 14, in which the linear scale includes longitudinally distributed positional magnetic fields of alternating polarity, and in which each magnetoresistive element is mounted in close proximity to the linear scale for sensing the presence and polarity of corresponding ones of the magnetic fields.

* * * * *